June 2, 1942.  J. A. ROOK ET AL  2,285,054
DIRECTIONAL SIGNAL FOR AUTOMOBILES AND THE LIKE
Filed Feb. 1, 1939  3 Sheets-Sheet 3

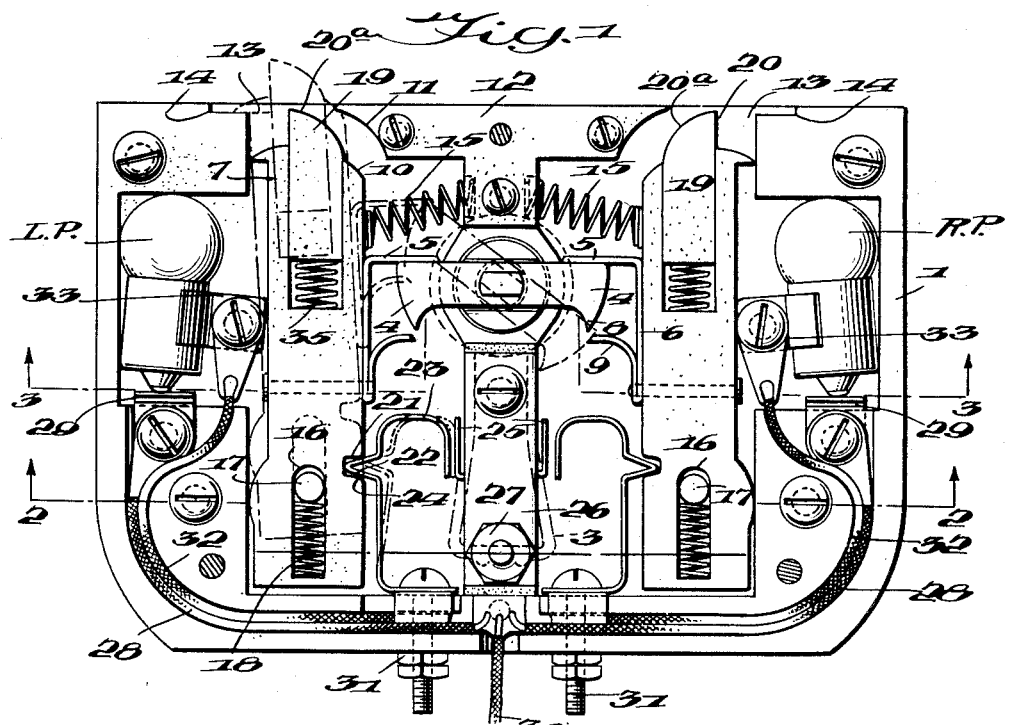

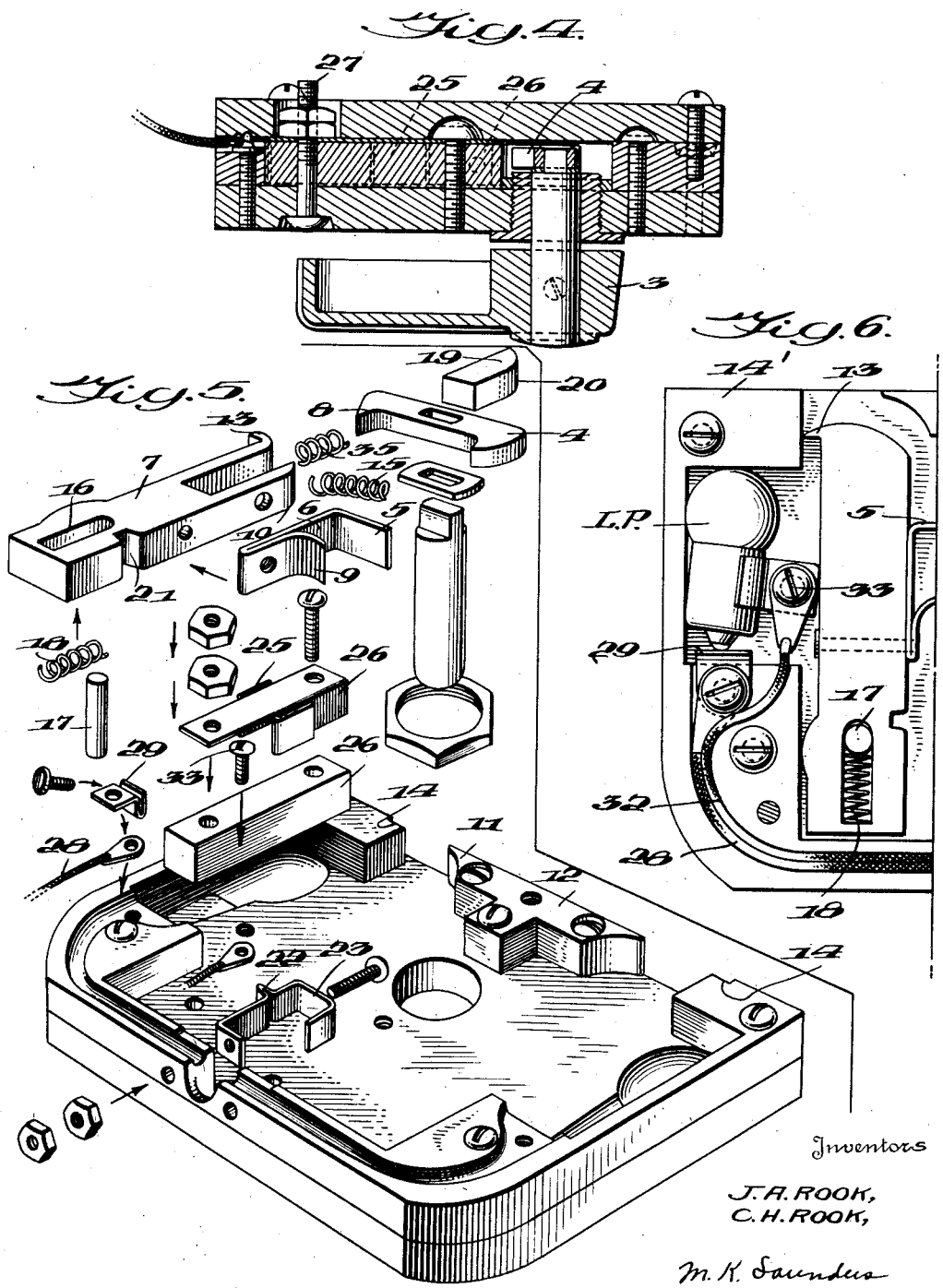

Inventors
J. A. ROOK,
C. H. ROOK,

By M. K. Saunders
Attorney

Patented June 2, 1942

2,285,054

UNITED STATES PATENT OFFICE 2,285,054

DIRECTIONAL SIGNAL FOR AUTOMOBILES AND THE LIKE

James A. Rook and Clay H. Rook, Los Angeles, Calif.

Application February 1, 1939, Serial No. 254,098

6 Claims. (Cl. 200—59)

This invention relates to manually controlled directional signals for automobiles and the like and the object of the invention is to provide such a signal with means which will prevent the simultaneous operation of two signals which would indicate opposite directional movement of the vehicle.

Another object of the invention is to provide a manually controlled directional signal for automobiles and the like wherein the operation of the vehicle in one direction will automatically cut off a previously given signal for the opposite direction.

Another object of the invention is to provide a directional signal for automobiles and the like wherein means controlled by the steering gear of the automobiles will automatically cut off a given signal for movement in one direction when the automobile is steered in the opposite direction.

Another object of the invention is to provide a manually controlled directional signal for automobiles and the like wherein a given signal will be cut off when the signal for movement in the opposite direction is given.

We accomplish the above and other objects of the invention which will be apparent as the description proceeds by means of the construction shown in the accompanying drawings, in which Fig. 1 is a plan of the device constituting our invention, the cover for the casing being removed;

Fig. 2 is a horizontal section on the line 2—2 of Fig. 1 looking in the direction of the arrows;

Fig. 3 is a horizontal section on the line 3—3 of Fig. 1 looking in the direction of the arrows;

Fig. 4 is a central vertical section taken at right angles to Figs. 2 and 3;

Fig. 5 is an exploded view of the interior of the casing, showing the elements for operating one signal and one pilot light, the body of the casing being shown in perspective;

Fig. 6 is an elevation showing a modified form of operating slide;

Figure 7:
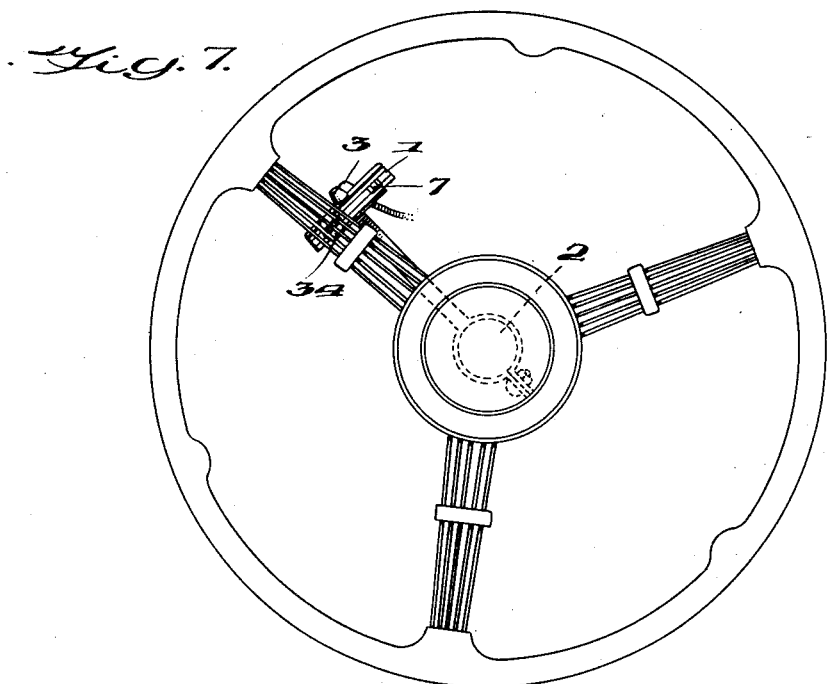
Fig. 7 is a top plan of a steering wheel showing our invention positioned in operative relation thereto.
Figure 8:
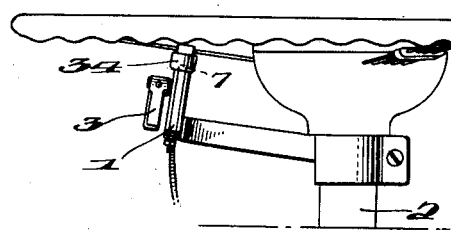
Fig. 8 is a side elevation of the construction shown in Fig. 7.
Figure 10:
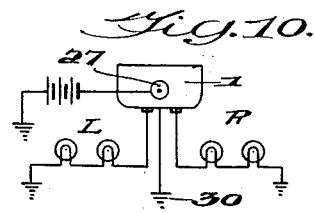
Fig. 9 is an elevation of a modified form of our invention showing the automatic releasing means secured to the steering rod instead of the steering wheel of the automobiles and Fig. 10 is a diagrammatic showing of the electric circuit including our invention.

On the drawings, in which like reference characters indicate like parts on all the views thereof, 1 indicates the casing herein shown as mounted on the steering column 2 of an automobile.

Pivotally mounted on the exterior of the casing, within convenient reach of the driver, is the manual switching arm 3 operatively connected to the center of the pivoted plate 4 on the interior of the casing, the upper ends of the plate being positioned beneath the projections 5 on the plates 6 which are secured to the slides 7 on the right and left hand sides of the casing. The ends of the plate 4 have fingers 8 which are adapted to engage with a second set of projections 9 on the plates 6 for a purpose which will presently appear.

Since the operating elements for the right and left hand signals and pilot lights are duplicates, only one set of operating elements will be described, that of the left manually operated construction being selected for illustration.

The slide 7 is mounted for reciprocation to project through an opening in the upper edge of the casing during operation of the same and, in order to facilitate the projection, it is provided with an upper rounded face 10 which rides under the correspondingly curved surface 11 of the block 12, thus causing the slide to be rocked slightly at an angle so that the projection 13 will seat itself in the recess 14 of the casing, thus biasing the spring 15. In order to permit of this reciprocating and pivoting action of the slide 7, it is formed with a slot 16 in which rides a pin 17 fixed in the casing. When the slide is projected outwardly, the spring 18 will be compressed.

In the preferred construction shown in Fig. 1, the slide 7 is provided with a sliding spring pressed plunger 19 which has a straight face 20 and a rounded face 20ª which engages under the curved surface 11 of the block 12.

The slide 7 is formed with a notch 21 on its inner edge to receive a projection 22 of a resilient contact 23. The notch 21 has a rounded lower surface 24 so that the projection 22 will ride thereover easily and out of the recess when the slide is projected outwardly. The projection 22 will, when unseated, be engaged by the straight edge of the slide and the resilient contact 23 will be urged against the contact 25 on the contact block 26 on which is mounted the terminal 27. When this contact has been made on the left hand side, for example, current will then flow through block 26, contact elements 23 and 25 to terminal 31, and from there through lead wire 32 to contact 33 and left pilot LP and through 29 and lead wire 28 to ground 30. Current also flows through 31 and the lead wire to the left signal L. If the switch arm is moved to the right, the same action will take place on the right hand side of the device and right pilot RP and right signal R will be illuminated.

While our signalling means is manually operated, both to "on" and "off" positions, means are also provided for automatically cutting off an erroneous signal, for example, when the right hand signal has been given and the vehicle is then turned to the left. This means consists of a button 34 mounted on the steering wheel in such position that it will ride over the upper edge of the casing and come in contact with the straight face 20 of the plunger 19 pushing the plunger and slide to the left, the rounded faces 10 and 20ª then riding under the curved surface 11 of the block 12 and unseating the projection 13, whereupon the plunger and slide will be withdrawn into the casing.

In practice, the button 34 is secured to the spoke arm of the steering wheel which is in lowermost position, or what constitutes the stem of the Y when the wheel is in straight ahead driving position, so that when a manual signal is given for a turn in one direction and the turn is actually made in the opposite direction, the button 34 will cut off the first made signal automatically. Referring to Fig. 7, let it be assumed that the left hand manual signal has been operated and the turn has then been made in opposite or right direction, the button 34 will have been carried in a clockwise direction and will engage the slide on the left hand side as above described and the slide and plunger will be withdrawn in the casing and the signal to the left cut off.

*Operation*

When the switch arm has been turned to the left, the left hand side of the centrally pivoted plate will engage under the projection 6 carried by the slide 7 and the slide will be projected outwardly through the opening in the upper edge of the casing. As the upper faces of the slide and the spring pressed plunger carried thereby ride under the curved surface 11 of the block 12, the slide will be rocked slightly on the pivot pin 17, whereupon the extension 13, as soon as it clears the top edge of the casing, will seat itself thereon, thus holding the slide in projected position, as shown in dotted lines on the left hand side of Fig. 1. At this time, the spring 15 will be tensioned and the spring 18 compressed.

While this is taking place, the projection 22 of the contact 23 will ride out of the notch 21 of the slide and the straight edge of the slide will bear against the projection and force the contact into engagement with the cooperating contact 25 on the contact block 26, thus completing the circuit to the left pilot and the left signal, as previously described.

Operation of the manual switch to restore the parts to neutral position will cause the projection 8 of the plate 4 to engage the curved face of the projection 9 of the plate 6 which will tend to straighten the slide, carrying the rounded faces 10 and 20ª under the curved surface 11 of the block 12 and restore the slide to its rectilinear position and withdraw the projection 13 from the top edge of the casing, whereupon, through the action of the compressed spring 18 and the tensioned spring 15, the slide will be withdrawn into the casing.

It is apparent that only one signal can be given at a time since movement of the right arm of 4 outwardly to project its slide, moves the left arm of 4 inwardly, withdrawing its respective slide, and vice versa.

In order to prevent confusing signals being given, automatic means are provided for cutting off a signal for one direction when the vehicle is actually turned in the opposite direction. This means, as above described, consists of the button 34 on the steering wheel. It is to be noted that when a signal for one direction is given and the vehicle is turned in that direction, the button 34 will ride over the rounded face of the spring pressed plunger 19 and compress the spring 35 without affecting the withdrawal of the slide and cutting off the signal.

In Fig. 6, is shown a modified form of slide wherein the spring pressed plunger 19 is omitted, in which case, it is apparent that the button 34 on the steering wheel must have sufficient resiliency to permit it to slide over the upper edge of the slide when it is being turned to the left after a left hand signal has been given and conversely when it is turned to the right after a right hand signal has been given.

Figure 9:
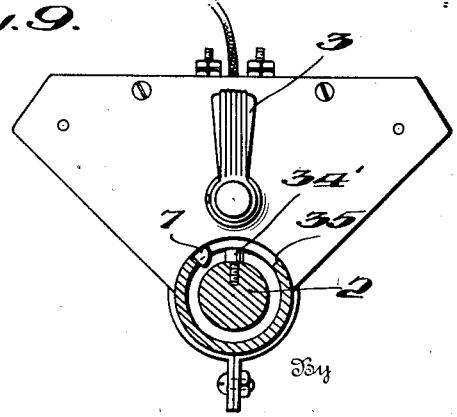

In Fig. 9, is shown a construction wherein the device is adapted to be mounted on the steering column with the slides projecting into the column. In this construction, it will be seen that it is necessary to cut away a portion of the steering column, as shown, at 35 and have the upper edge of the casing conform to the shape of the steering wheel column. The automatic operating means consists of the button 34' secured to the steering rod in such position that it will engage one or the other of the slides 7 as it is turned to the right or the left when making the turn.

It is apparent that the operation of the modifications described is substantially with that of the preferred form of the invention.

It is also within the purview of our invention to provide two pushbuttons on the steering wheel, one on the right and one on the left hand side, in which case the automatic cutoff will take place in a shorter time than if only one push-button were provided.

Having thus described our invention, what we claim as new and desire to secure by Letters Patent is:

1. A switch comprising a casing, a fixed contact in said casing, a movable contact in said casing cooperating with said fixed contact, a projection on said movable contact, a slide in said casing mounted for longitudinal and pivotal movement, said slide engaging said projection to force said movable contact against said fixed contact when said slide is moved longitudinally, cooperating means on said slide and casing for latching said slide when the contacts are in engagement, and cooperating means, on said slide and casing for urging the parts to latching position.

2. A switch comprising a casing, a fixed contact in said casing, a movable contact in said casing cooperating with said fixed contact, means for operating said movable contact, said means comprising a normally spring retracted slide mounted for longitudinal and pivotal movement, means for reciprocating and pivoting said slide, means for returning said slide to its normal position, said last named means comprising a projection on said slide and a pivoted plate on said casing whereby when said plate engages the projection, the slide will be rocked on its pivot to straighten the same, and cooperating means on said movable contact and said slide for holding the movable contact in non-contact engaging position.

3. A switch comprising a casing, a fixed contact in said casing, a movable contact in said casing, a slide for operating said movable contact, said slide being mounted for limited longitudinal and pivotal movement, cooperating means on said slide and casing for rocking said slide on its pivot, cooperating means on said slide and casing for latching said slide in one extreme position of its longitudinal and pivotal movement, and cooperating means on said slide and said movable contact for holding the latter away from the fixed contact.

4. A switch comprising a casing, a fixed contact in said casing, a movable contact in said casing cooperating with said fixed contact, means for operating said movable contact, said means comprising a slide, said slide being mounted for longitudinal and pivotal movement, means for moving said slide longitudinally, an inclined face on said slide, an inclined face on said casing cooperating with the inclined face on the slide whereby said slide is rocked on its pivot when it is moved longitudinally.

5. A switch comprising a casing, a fixed contact in said casing, a movable contact in said casing cooperating with said fixed contact, means for operating said movable contact, said means comprising a slide, said slide being mounted for longitudinal and pivotal movement, means for moving said slide longitudinally, a spring pressed plunger carried by said slide, a rounded face on said plunger, a cooperating face on said casing for engaging the rounded face on the plunger to force the same inwardly against the action of the spring when the slide is moved outwardly, and cooperating means on the slide and casing for latching the slide in its outermost position.

6. A directional signal comprising a casing, a fixed contact in said casing, a movable contact in said casing, cooperating with said fixed contact, means for operating said movable contact, said means comprising a slide provided with a recess in said casing, cooperating means on said casing and slide for holding said contacts in engagement with each other, and means for holding said contacts out of engagement with each other, said last named means comprising a portion on said movable contact positioned in the recess in the slide in one position of the slide, and means for operating said slide to force the movable contact portion out of the recess and the movable contact into engagement with the fixed contact.

JAMES A. ROOK.
CLAY H. ROOK.